(12) United States Patent
Castoldi et al.

(10) Patent No.: US 6,728,465 B1
(45) Date of Patent: Apr. 27, 2004

(54) SEMI-RECONFIGURABLE SUBBAND OADM

(75) Inventors: Andrea Castoldi, Monza (IT); Marco Mazzini, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 7 days.

(21) Appl. No.: 10/233,742

(22) Filed: Sep. 3, 2002

(51) Int. Cl.[7] ............................. G02B 6/00; G02B 6/36
(52) U.S. Cl. .................. 386/24; 398/121; 398/115; 385/10
(58) Field of Search .................. 385/24, 147, 10; 398/115, 121

(56) References Cited

U.S. PATENT DOCUMENTS

| | | | |
|---|---|---|---|
| 5,418,507 A | * | 5/1995 | Keane et al. ............... 333/202 |
| 5,712,716 A | * | 1/1998 | Vanoli et al. ................ 398/34 |
| 5,748,349 A | | 5/1998 | Mizrahi ...................... 359/130 |
| 5,808,762 A | * | 9/1998 | Vanoli et al. ................ 398/79 |
| 5,943,314 A | * | 8/1999 | Croslin ........................ 370/216 |
| 6,038,045 A | | 3/2000 | Sotom et al. ............... 359/128 |
| 6,055,348 A | | 4/2000 | Jin et al. ...................... 385/37 |
| 6,185,023 B1 | | 2/2001 | Mizrahi ...................... 359/130 |
| 6,208,443 B1 | | 3/2001 | Liu et al. .................... 359/127 |
| 6,310,994 B1 | | 10/2001 | Jones et al. ................... 385/24 |
| 6,317,539 B1 | | 11/2001 | Loh et al. ..................... 385/37 |
| 6,570,893 B1 | * | 5/2003 | Libatique et al. ............. 372/20 |

FOREIGN PATENT DOCUMENTS

EP          0794629 A3    3/1998    ............ H04J/14/02

* cited by examiner

Primary Examiner—Akm Enayet Ullah
(74) Attorney, Agent, or Firm—Ritter, Lang & Kaplan LLP

(57) ABSTRACT

A partially configurable optical add/drop multiplexer (OADM) is provided. Fixed single channel and wideband tunable fiber Bragg gratings may be used in combination. OADM channel configuration may be changed by tuning one or more tunable fiber Bragg gratings.

20 Claims, 4 Drawing Sheets

US 6,728,465 B1

SEMI-RECONFIGURABLE SUBBAND OADM

STATEMENT OF RELATED APPLICATIONS

The present application is related to the subject matter of U.S. patent application Ser. No. 09/865,473 filed on May 24, 2001, entitled "WAVELENGTH ADD-DROP MULTIPLEXER FOR BAND DROP ON DENSE CHANNEL GRID," the contents of which are incorporated by reference herein in their entirety for all purposes.

BACKGROUND OF THE INVENTION

The present invention relates to optical communications, and more particularly to optical communication systems employing multiple wavelengths.

Wavelength division multiplexing (WDM) is a technique used to combine multiple optical signals having disparate wavelengths onto the same fiber. This technique has many advantages in implementing optical communication systems including increased capacity and the ability to use passive optical components to redirect a portion of the signal flowing along the fiber for processing at an intermediate node.

The trend in optical communication systems is toward greater numbers of wavelengths, narrower spacings between channels, higher data rate signals, and longer distance transmission without the use of repeaters. Along very long links, it is normally desirable to reroute, terminate, and/or insert wavelengths at intermediate points. Accordingly, it is typical to include optical add/drop multiplexers (OADMs) that are capable of removing and substituting selected wavelengths in the optical signal flowing through an intermediate point along the link. Such OADMs are often combined at the same line site with all-optical amplifiers such as Erbium-doped fiber amplifiers (EDFAs) and/or dispersion compensation units (DCUs).

The number of wavelengths to be removed and substituted and their spectral locations will be different for each line site. A difficulty then arises in that passive optical components of the OADM must then be specified differently for each line site, raising costs, and limiting operator flexibility in reconfiguring the network.

What is needed is increased configurability of OADMs to accommodate requirements of different line sites.

SUMMARY OF THE INVENTION

By virtue of one embodiment of the present invention, a partially configurable optical add/drop multiplexer (OADM) is provided. Fixed single channel and wideband tunable fiber Bragg gratings may be used in combination. OADM channel configuration may be changed by tuning one or more tunable fiber Bragg gratings.

A first aspect of the present invention provides apparatus for processing a multi-wavelength optical signal in a frequency-selective manner. The apparatus includes: a first optical notch filter that reflects optical energy at a first selected wavelength and passes other optical energy, a second optical notch filter that reflects optical energy at a second selected wavelength and passes other optical energy, and a tunable passband filter that reflects optical energy within a tunable passband and passes other optical energy, the tunable passband filter and the first and second optical notch filters being in cascade with another.

A second aspect of the present invention provides a method for processing a multi-wavelength optical signal in a frequency-selective manner. The method includes: directing the optical signal through a first optical notch filter that reflects optical energy at a first selected wavelength and passes other optical energy, directing the optical signal through a second optical notch filter that reflects optical energy at a second selected wavelength and passes other optical energy, and directing the optical signal through a tunable passband filter that reflects optical energy within a tunable passband and passes other optical energy. The tunable passband filter and the first and second optical notch filters are in cascade with another.

Further understanding of the nature and advantages of the inventions herein may be realized by reference to the remaining portions of the specification and the attached drawings.

DESCRIPTION OF SPECIFIC EMBODIMENTS

The present invention finds application, e.g., in wavelength division multiplexing (WDM) systems where add-drop multiplexers are employed to remove signals at certain wavelengths and/or substitute new signals at the same wavelengths. For example, an optical add/drop multiplexer according to the present invention may be included at an intermediate site along a WDM communication link to provide local connectivity to selected wavelengths.

Embodiments of the present invention provide a degree of configurability in that tunable optical filtering components may be adjusted in accordance with specific needs. To overcome constraints of, e.g., tuning repeatability, tuning resolution, temperature stability, etc., fixed optical filtering components may be used at the band edges of the tunable components. This reduces the need for guard bands (i.e., blank channels) at the tunable filter passband edges.

An example system according to one embodiment of the present invention will now be presented. An ultra-long haul (ULH) communication link carries 80 channels spaced 25 GHz apart over a 16.6 nm bandwidth. Of course, these values are merely representative and the present invention is not limited to any particular optical link parameters.

Figure 1:
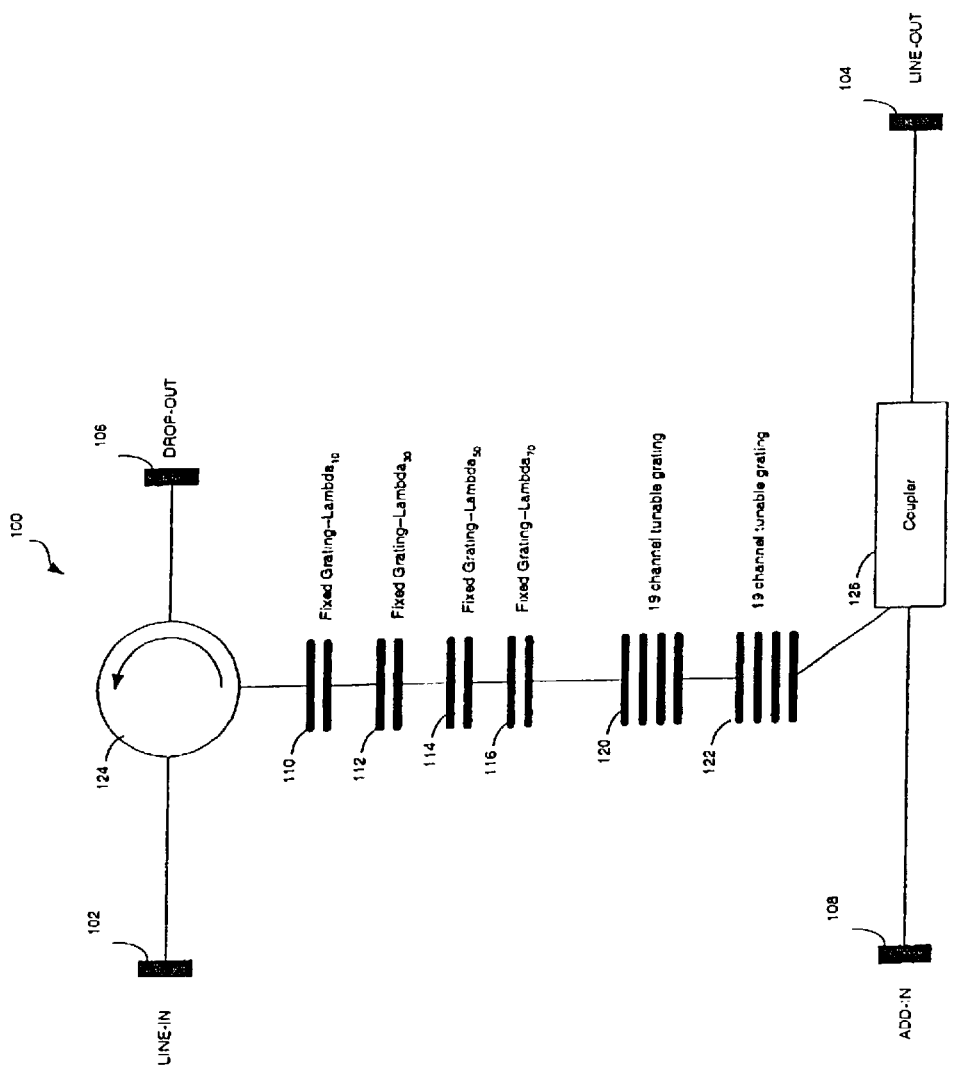
FIG. 1 depicts an optical add/drop multiplexer according to one embodiment of the present invention.

FIG. 1 depicts an optical add/drop multiplexer (OADM) 100 that may be installed at an intermediate point along such a link. OADM 100 has four ports. A LINE-IN port 102 accepts the WDM optical signal as received at the line site. A LINE-OUT port 104 transmits the WDM optical signal further along the line after the desired dropping and adding of channels. A DROP-OUT port 106 provides local access to dropped channels. An ADD-IN port 108 allows for input of channels to be substituted for the dropped ones.

Wavelength-selective processing of the WDM signal is provided by a series of passive optical components. In the depicted example, there are four fixed wavelength fiber Bragg gratings 110, 112, 114, and 116. Fixed gratings 110, 112, 114, and 116 each reflect optical energy at a single wavelength and transmit optical energy at other wavelengths. In the 80 channel scheme, fixed grating 110 reflects optical energy at $\lambda_{10}$, fixed grating 112 reflects optical energy at $\lambda_{30}$, fixed grating 114 reflects optical energy at $\lambda_{50}$, and fixed grating 116 reflects optical energy at $\lambda_{70}$. Fixed gratings useful in implementing embodiments of the present invention include the FBDFG series available from JDS Uniphase, the DWDM-25 available from Optic Wave Communications, and other products available from Highwave Technology and Redfern Components.

There are also two tunable fiber Bragg gratings 120 and 122. Each reflect optical energy over a 19 channel wide passband and transmit optical energy outside the passband. The passband may be shifted as desired through the spectrum occupied by the WDM signal. Examples of tunable fiber Bragg gratings useful in implementing embodiments of the present invention include the FlexFilter available from Bragg Photonics, the TFGF-2001 available from Optic wave Communications, and other products available from Advanced Optics Solutions and O/E Land, Inc.

The tunable and fixed gratings are connected together in a cascade configuration. The cascaded gratings are coupled to LINE-IN port 102 and DROP-OUT port 106 via a 3-port circulator 124. They are coupled to ADD-IN port 108 and LINE-OUT port 104 via a coupler 126. The coupling ratio may be chosen to in order to optimize OADM loss characteristics. Chromatic dispersion compensation components may be inserted between coupler 126 and the cascaded gratings if desired.

By appropriate tuning of gratings 120 and 122, one may vary the number and placement of added and dropped channels. Either 4, 13, 14, 23, 33, or 42 channels may be dropped and substituted, corresponding to 5%, 16%, 18%, 29%, 40%, 41%, or 53% of the overall channel count.

Figure 2:
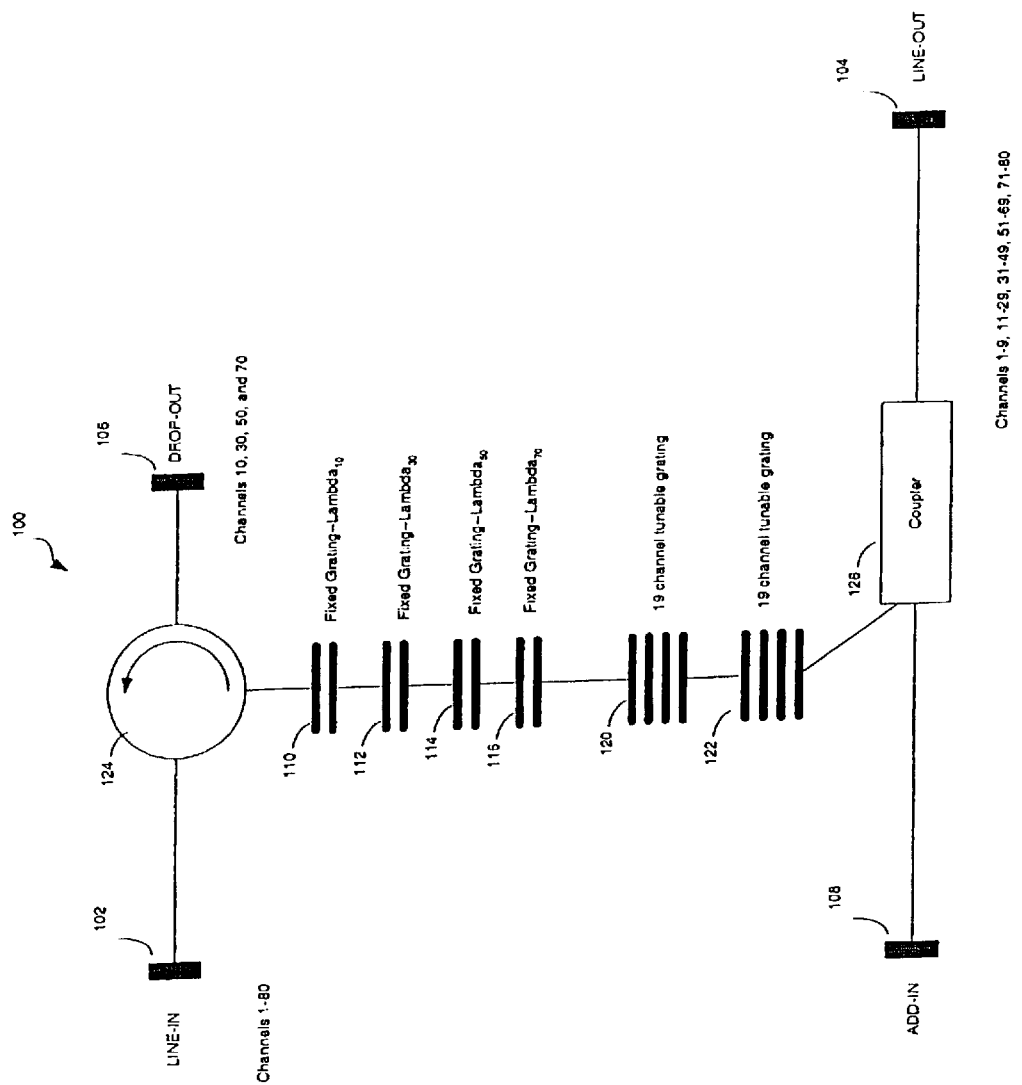
FIG. 2 depicts a configuration of the optical add/drop multiplexer of FIG. 1 where 4 channels are dropped according to one embodiment of the present invention.

FIG. 2 depicts a scenario where 4 channels are dropped. Tunable gratings 120 and 122 have their passbands shifted outside the 80 channel WDM range. Thus, only gratings 110, 112, 114, and 116 reflect optical energy to DROP-OUT port 106. Thus, wavelengths $\lambda_{10}$, $\lambda_{30}$, $\lambda_{50}$, and $\lambda_{70}$ are dropped while other wavelengths are passed through. Substitute signals for these wavelengths may be provided at ADD-IN port 108.

Figure 3:
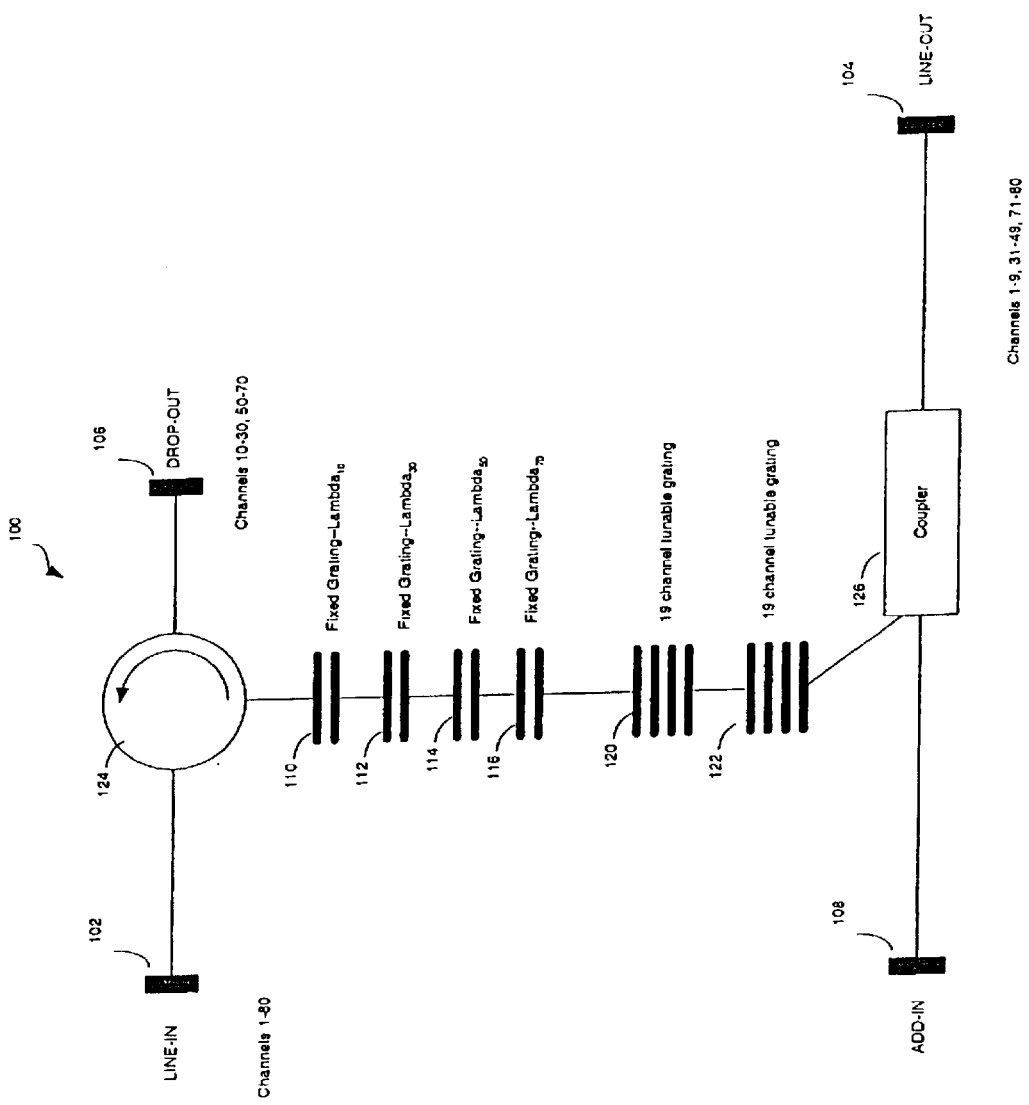
FIG. 3 depicts a configuration of the optical add/drop multiplexer of FIG. 1 where 42 channels are dropped according to one embodiment of the present invention.

FIG. 3 depicts a scenario where the maximum number of channels are dropped, 42. This corresponds to 53% of the overall channel count. The passband of tunable grating 120 has been shifted so that it extends from $\lambda_{11}$ through $\lambda_{29}$. The passband of tunable grating 122 has been shifted so that it extends from $\lambda_{51}$ through $\lambda_{69}$. The fixed grating notches are thus positioned at the edges of the tunable passbands and overlap with the relatively shallow passband skirts. Good performance is thus assured in the transition region defined by the tunable passband skirts. Again, substitute signals for the dropped wavelengths may be provided at ADD-IN port 108.

Figure 4:
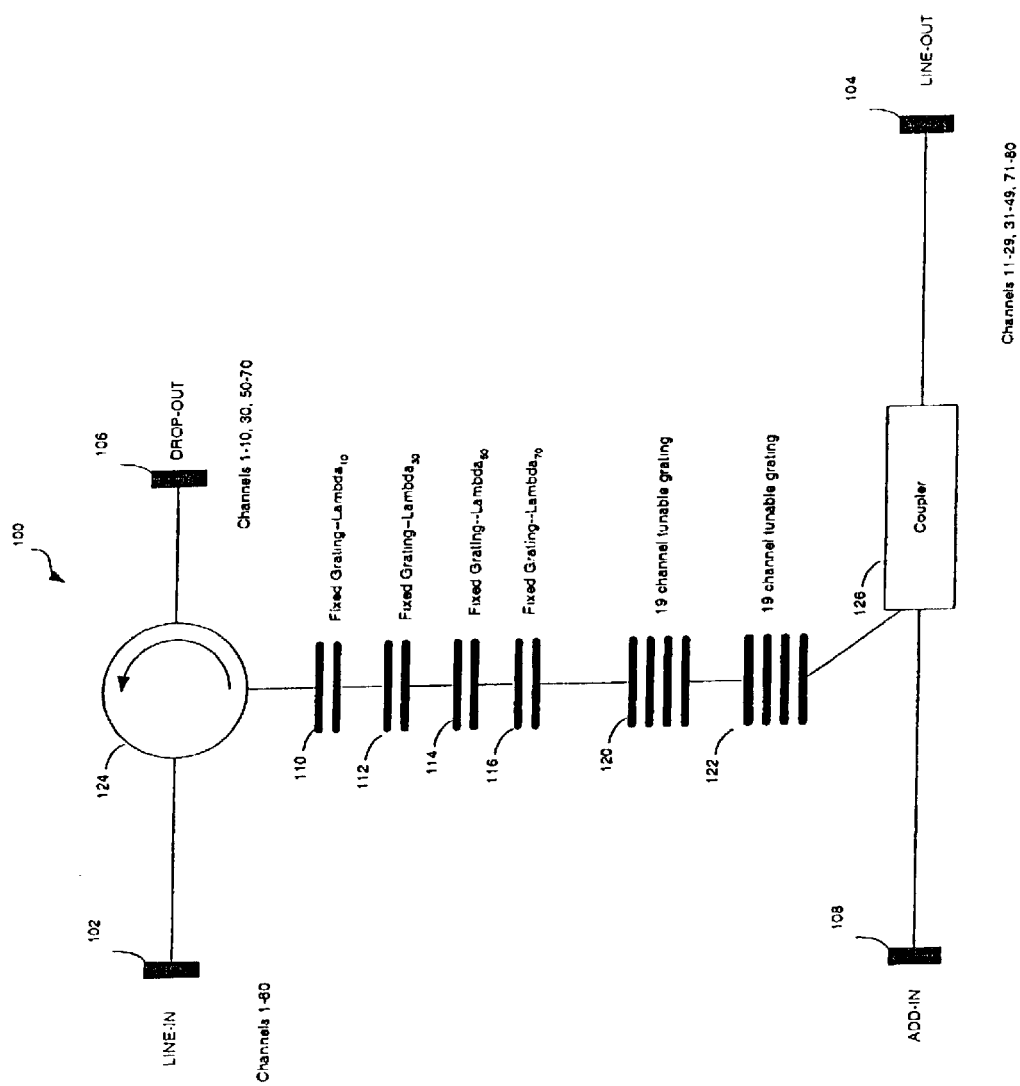
FIG. 4 depicts a configuration of the optical add/drop multiplexer of FIG. 1 where 23 channels are dropped according to one embodiment of the present invention.

FIG. 4 depicts a scenario where 23 channels are dropped. Tunable grating 120 has its passband shifted so that its top edge lines up with $\lambda_9$ while its bottom edge is out of band. Tunable grating 122 is positioned between $\lambda_{51}$ through $\lambda_{69}$. The effect is that channels $\lambda_1$ through $\lambda_{10}$, $\lambda_{30}$, and $\lambda_{51}$ through $\lambda_{70}$ are dropped, representing 29% of the overall channel count.

In general the passbands may be shifted through the overall WDM spectrum. It is preferable that where passband edges lie within the overall WDM spectrum, they should be adjacent to the notch of a fixed grating. This avoids the need for deleting channels within the passband filter skirts where there may not be optimal isolation between dropped and passed channels.

The above-described system has many advantages. If it is necessary to add or drop multiple wavelengths, one can do so far more simply and inexpensively, and with lower insertion loss and flatter response across wavelength, than systems that employ individual single channel gratings for each wavelength. The solution can be implemented by integrating off-the-shelf components rather than custom-built parts. The exact add/drop channel configuration can be set in the field in response to customer needs, thereby simplifying manufacturing and operations.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, different numbers and arrangements of gratings may be utilized consistent with the present invention. Suitable substitutes may be used for gratings and other components. Also, components may be rearranged and substituted within the scope of the present invention.

What is claimed is:

1. Apparatus for processing a multi-wavelength optical signal in a frequency-selective manner, said apparatus comprising:

a first optical notch filter that reflects optical energy at a first selected wavelength and passes other optical energy;

a second optical notch filter that reflects optical energy at a second selected wavelength and passes other optical energy; and a tunable passband filter that reflects optical energy within a tunable passband and passes other optical energy, said tunable passband filter and said first and second optical notch filters being in cascade with another.

2. The apparatus of claim 1 wherein said tunable passband filter has a bandwidth substantially equal to a difference between said second selected wavelength and said first selected wavelength.

3. The apparatus of claim 2 wherein said first optical notch filter and said second optical notch filters comprise fixed center frequency fiber Bragg gratings and said tunable passband filter comprises a tunable fiber Bragg grating.

4. The apparatus of claim 3 wherein said tunable fiber Bragg grating may be tuned so that said first and second selected wavelengths are at edges of said tunable passband.

5. The apparatus of claim 3 wherein said tunable fiber Bragg grating may be tuned so that said first selected wavelength is at an edge of said tunable passband but not said second selected wavelength.

6. The apparatus of claim 1 configured as an add/drop multiplexer and wherein an input port of said add/drop multiplexer and a drop port of said add/drop multiplexer are coupled to said cascaded first and second optical notch filters and tunable passband filters via a circulator.

7. The apparatus of claim 6 wherein a coupler couples said cascaded first and second optical notch filters and tunable passband filters to an add port and an out port.

8. The apparatus of claim 7 further comprising:

said circulator and said coupler.

9. A method for processing a multi-wavelength optical signal in a frequency-selective manner, said method comprising:

directing said optical signal through a first optical notch filter that reflects optical energy at a first selected wavelength and passes other optical energy;

directing said optical signal through a second optical notch filter that reflects optical energy at a second selected wavelength and passes other optical energy; and directing said optical signal through a tunable passband filter that reflects optical energy within a tunable passband and passes other optical energy, said tunable passband filter and said first and second optical notch filters being in cascade with another.

10. The method of claim 9 further comprising providing a bandwidth of said tunable passband filter to be substantially equal to a difference between said second selected wavelength and said first selected wavelength.

11. The method of claim 10 wherein said first optical notch filter and said second optical notch filters comprise fixed center frequency fiber Bragg gratings and said tunable passband filter comprises a tunable fiber Bragg grating.

12. The method of claim 11 further comprising tuning said tunable fiber Bragg grating so that said first and second selected wavelengths are at edges of said tunable passband.

13. The method of claim 11 further comprising tuning said tunable fiber Bragg grating so that said first selected wavelength is at an edge of said tunable passband but not said second selected wavelength.

14. The method of claim 9 further comprising obtaining said multi-wavelength optical signal for input to said cascaded first and second optical notch filters and tunable passband filters via a circulator wherein ports of said circulator represent an input port of an add/drop multiplexer and a drop port of said add/drop multiplexer.

15. The method of claim 14 further comprising coupling said cascaded first and second optical notch filters and tunable passband filters to an add port and an out port of said add/drop multiplexer.

16. Apparatus for processing a multi-wavelength optical signal, said apparatus comprising:

first means for notch filtering said optical signal, said first notch filtering means reflecting optical energy at a first selected wavelength and passing other optical energy;

second means for notch filtering said optical signal, said second notch filtering means reflecting optical energy at a second selected wavelength and passing other optical energy; and tunable means for passband filtering said optical signal, said tunable passband filtering means reflecting optical energy within a tunable passband and passing other optical energy, wherein said tunable passband filtering means and said first and second notch filtering means are in cascade with another.

17. The apparatus of claim 16 wherein a bandwidth of said tunable passband filtering means is substantially equal to a difference between said second selected wavelength and said first selected wavelength.

18. The apparatus of claim 17 wherein said first optical notch filtering means and said second optical notch filtering means comprise fixed center frequency fiber Bragg gratings and said tunable passband filtering means comprises a tunable fiber Bragg grating.

19. The apparatus of claim 18 wherein said tunable fiber Bragg grating is tuned so that said first and second selected wavelengths are at edges of said tunable passband.

20. The apparatus of claim 18 wherein said tunable fiber Bragg grating is tuned so that said first selected wavelength is at an edge of said tunable passband but not said second selected wavelength.

\* \* \* \* \*